US010921779B2

(12) United States Patent
Amer et al.

(10) Patent No.: US 10,921,779 B2
(45) Date of Patent: Feb. 16, 2021

(54) PROCESS AND SYSTEM FOR PROVIDING A MACHINING METHOD FOR MANUFACTURING A FEATURE IN A PART

(71) Applicant: SIEMENS INDUSTRY SOFTWARE INC., Plano, TX (US)

(72) Inventors: Majed Amer, Kfar Qassem (IL); Yahel Aricha, Givat Shmuel (IL); Tom Van 'T Erve, Enschede (NL)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/347,635

(22) PCT Filed: Nov. 4, 2016

(86) PCT No.: PCT/IB2016/001588
§ 371 (c)(1),
(2) Date: May 6, 2019

(87) PCT Pub. No.: WO2018/083512
PCT Pub. Date: May 11, 2018

(65) Prior Publication Data
US 2019/0310608 A1  Oct. 10, 2019

(51) Int. Cl.
*G05B 19/4097* (2006.01)

(52) U.S. Cl.
CPC .......... *G05B 19/4097* (2013.01); *G05B 2219/35086* (2013.01); *G05B 2219/35091* (2013.01); *Y02P 90/02* (2015.11)

(58) Field of Classification Search
None
See application file for complete search history.

(56) References Cited

U.S. PATENT DOCUMENTS

| 6,047,225 A | 4/2000 | Iriguchi et al. |
| 7,363,103 B2 | 4/2008 | Takahashi et al. |
| (Continued) | | |

FOREIGN PATENT DOCUMENTS

| EP | 1677168 A1 | 7/2006 |
| WO | 2004068275 A2 | 8/2004 |

OTHER PUBLICATIONS

L. Zaquini et al.: "Expert system for the definition of the cutting parameters and machining strategies", Sixth International Conference on High Speed Machining, Mar. 21, 2007, (Mar. 21, 2007), pp. 1-5, XP055576473.

*Primary Examiner* — Ryan A Jarrett
(74) *Attorney, Agent, or Firm* — Laurence Greenberg; Werner Stemer; Ralph Locher

(57) ABSTRACT

A machining method is provided for manufacturing a feature in a part. Feature data are received that describe a feature to be manufactured and include a type and a set of attributes of the feature. Machining method data are received that describe a machining method for manufacturing an associated feature. Machining methods associated with features of a given type are analyzed in order to define a set of ranges of feature attributes where the machining methods are applicable. A set of ranking values are assigned to each machining method for ordering machining methods. Data of an additional feature to be manufactured is received, the type of the additional feature being the given type and the set of attributes is a specific set. A set of machining methods is selected and at least one machining method is provided based on its assigned ranking value to be associated with the additional feature.

17 Claims, 3 Drawing Sheets

(56) References Cited

U.S. PATENT DOCUMENTS

| | | |
|---|---|---|
| 2005/0038821 A1 | 2/2005 | Wallen et al. |
| 2007/0038329 A1 | 2/2007 | Khurana et al. |
| 2014/0379119 A1 | 12/2014 | Sciacchitano et al. |
| 2015/0025672 A1* | 1/2015 | Hemmanur .......... G05B 19/182 700/160 |
| 2016/0098033 A1* | 4/2016 | Singh ................ G05B 19/4097 700/98 |

* cited by examiner

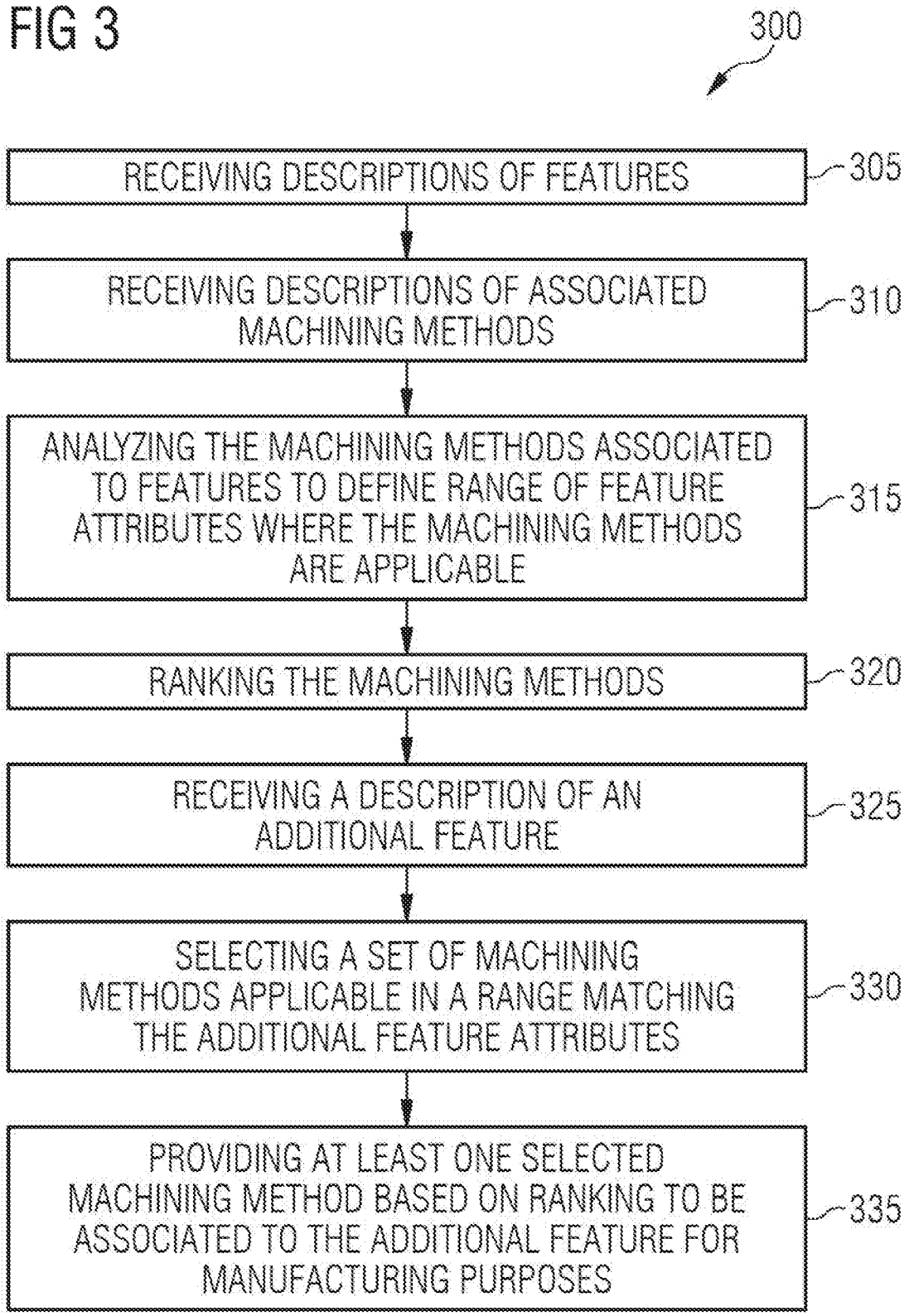

PROCESS AND SYSTEM FOR PROVIDING A MACHINING METHOD FOR MANUFACTURING A FEATURE IN A PART

TECHNICAL FIELD

The present disclosure is directed, in general, to computer-aided design ("CAM"), visualization, and manufacturing systems, ("CAM") systems, product lifecycle management ("PLM") systems, product data management ("PDM") systems, and similar systems, that manage data for products, production methods, and production execution and other items (collectively, "Product Data Management" systems or PDM systems). More specifically, the disclosure is directed to virtual tools for manufacturing planning and manufacturing verification, and manufacturing machine controller tools.

BACKGROUND OF THE DISCLOSURE

In the field of industrial manufacturing, in order to machine a part with one or more features, detailed machining methods need to be defined. As used herein the term "part" denotes manufacturing parts to be machined, and the term "feature" denotes a shape to be manufactured in the part. Examples of features of a part include, but are not limited to, a hole, a step-n-hole (a hole with n diameters), a threaded hole, a slot, and other types of cavities and shapes with specific surface finishing.

A machining method is defined by a sequence of machining operations, also called machining cycles, with certain tools. In the field of industrial automation, a machining method may be defined within a CAM program or within a program of a machine controller. The typical scenario of a CAM environment is here below discussed for illustration purposes. The skilled in the art will understand that similar considerations apply to the field of machine controllers.

Although for similar industrial cases, e.g. similar parts or similar features within parts, similar machining methods are defined by the CAM engineer, especially if she/he works within the same company, in reality in most industrial scenario there is unfortunately still too little re-usage of previous CAM programs.

In order to reuse CAM programs, databases of machining methods associated to the part features need to be generated. Such machining method databases comprise detailed definitions of the machining methods, applicability of each machining method for the feature shape and sizes, and priority rankings among a plurality of feasible machining methods for a given case. The known techniques for creating and maintaining such a machining database are task consuming and require expensive skilled CAM engineers so that most small/medium job shops cannot afford to have such a machining method database system implemented.

Therefore improved techniques are desirable.

SUMMARY OF THE DISCLOSURE

Various disclosed embodiments include processes and corresponding systems and computer-readable mediums for providing a machining method for manufacturing a feature in a part. The part is an object to be manufactured having a set of features. Each feature is manufactured by at least one machining method. A process includes receiving data of a set of features, each feature data describing a feature to be manufactured and comprising a type of the feature and a set of attributes of the feature. The process includes receiving data of a set of machining methods, each machining method data describing a machining method for manufacturing an associated feature. The process includes analyzing machining methods associated to features of a given type in order to define a set of ranges of feature attributes where said machining methods are applicable. The process includes assigning to each of the machining method a set of ranking values for ordering machining methods applicable in the same range of feature attributes. The process includes receiving data of an additional feature to be manufactured, wherein the type of the additional feature is the given type and the set of attributes of the additional feature is a specific set of attributes. The process includes selecting a set of machining methods which are applicable in a range of feature attributes matching the specific set of attributes. The process includes providing at least one machining method of the selected method set based on its assigned ranking value to be associated to said additional feature as the machining method for manufacturing the additional feature The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 illustrates a flowchart of a method for providing a machining method for manufacturing a feature in a part in accordance with disclosed embodiments.

DETAILED DESCRIPTION

Figure 1:
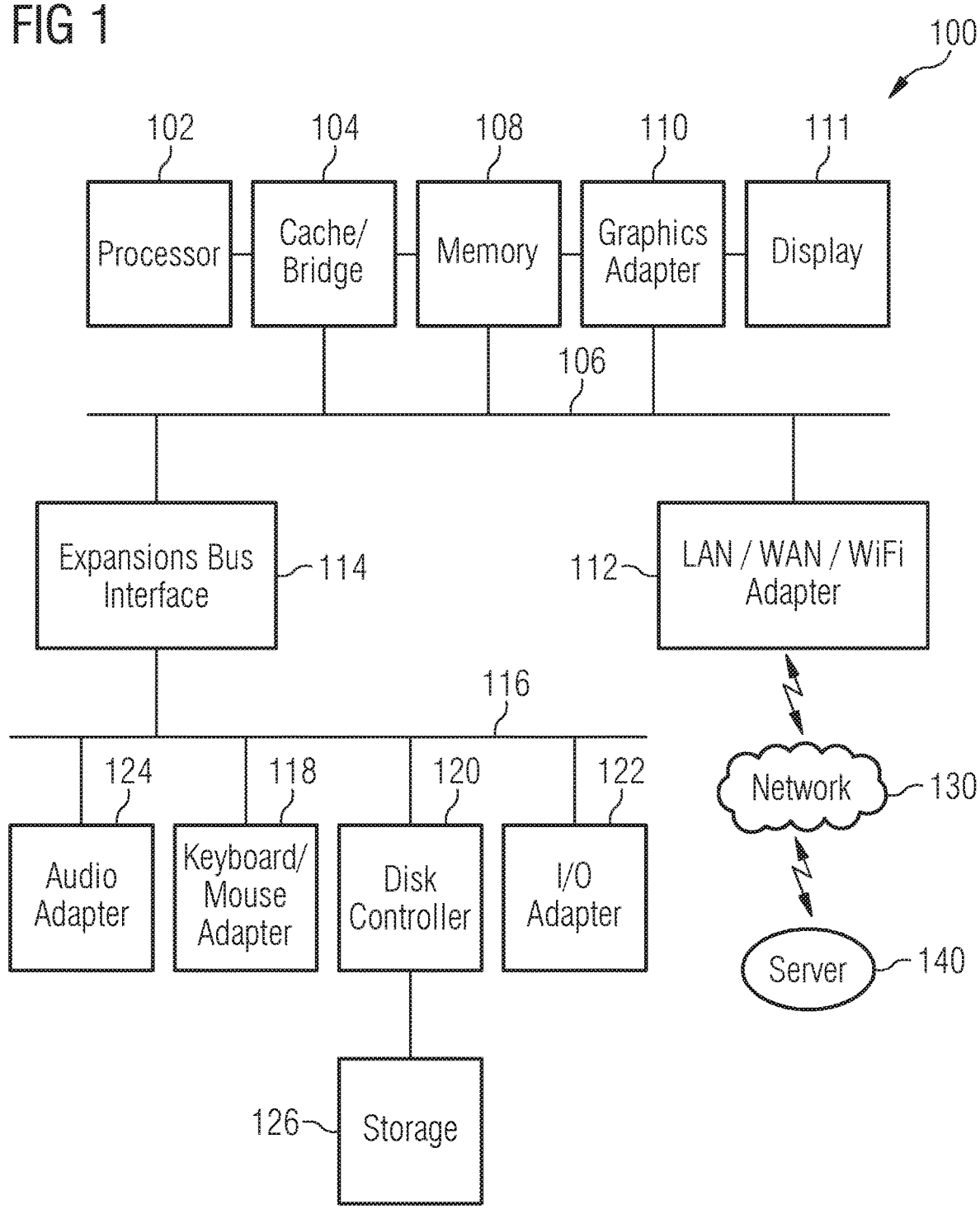
FIG. 1 illustrates a block diagram of a data processing system in which an embodiment can be implemented.
Figure 2:
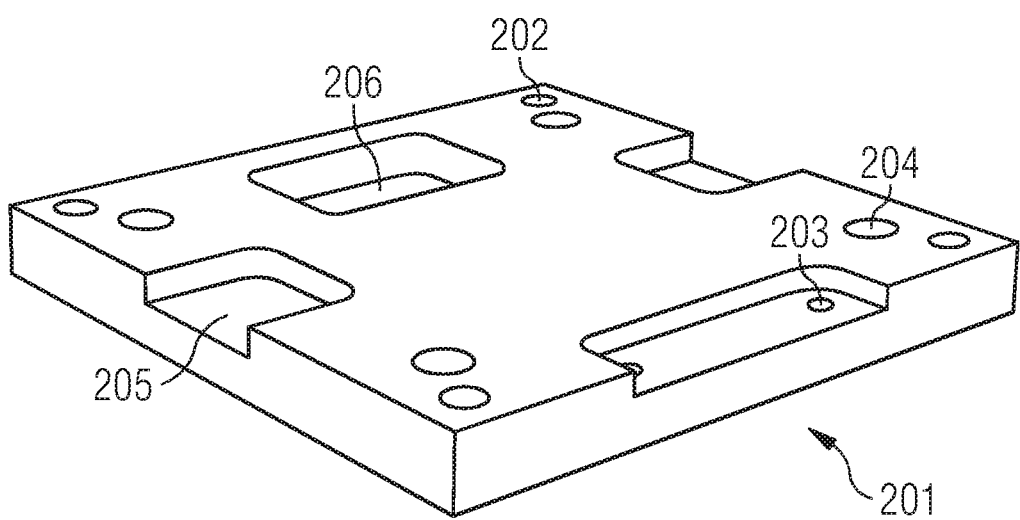
FIG. 2 illustrates a schematic view of a part to be manufactured with a plurality of features.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques are not satisfactory.

With embodiments, to the benefit of CAM engineers and machine operators, machining methods for manufacturing a part feature of a given type can be automatically generated. Such machining methods may be part of a CAM program or of a controller program.

Embodiments enable to generate a CAM program automatically given as input a 3D model representation, such as e.g. a CAD representation, of a part and their historical CAM programs.

Embodiments enable to automatically deduce the applicability rules and the priority rankings of feasible machining methods so that manual work for defining application rules is not required.

Embodiments enable to learn from the usage and/or selection of previously defined machining methods so as to improve the suggestion of machining methods to propose for manufacturing a feature of certain type and attributes.

Embodiments enable to take into account user feedback to update the method rankings and improve the machining method suggestion.

Embodiments allow generating in a fast and automatic manner a machine knowledge database.

Embodiments take into account rankings based on crowd usages and selections.

Embodiments reduce costs and are less error prone.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and 110 adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

One or more of the processor 102, the memory 108, and a simulation program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

FIG. 2 illustrates a schematic view of a manufacturing part to be manufactured with a plurality of features. Part 201 is an object having as features holes 202, 203, 204 of different diameters and two slots 205, 206 where slot 205 is a slot of partial rectangle type, and slot 206 is a slot of rectangle type. The part holes are of type step 1 holes with a single diameter. As used herein, the term "type" of a feature denotes the class of the feature (e.g. shape and material). As used herein, the terms "attributes" or "characteristics" of a feature interchangeably denote the dimensions of the feature (e.g. diameter) and the surface finishing of the feature (e.g. threaded).

EXAMPLE EMBODIMENT

An example embodiment is described below, illustrated also through Tables 1 to 4.

Historical three-dimensional (3D) model (e.g. CAD) files of parts to be manufactured and their corresponding machining CAM program files are provided as input to the data processing system. The CAD files comprise a 3D model description of a part with one or more features. The CAM program files include a description of the set of machining methods for manufacturing the parts with their features.

Historical CAD files and their corresponding CAM programs of this example were previously defined by CAM engineers. Table 1 comprises n example historical files with 3D representations of parts with corresponding machining methods usable in a manufacturing facility.

TABLE 1

| CAD + CAM teaching examples |
| --- |
| Example_1.prt |
| Example_2.prt |
| ... |
| Example_n.prt |

From the data of the files of Table 1, associations between recognized features and their corresponding extracted machining methods are generated as follows:
  running feature recognition on the CAD file to identify the features present in a part;
  for each recognized feature, finding the machining method that was applied by the CAM engineer for manufacturing such recognized feature;
  for each recognized feature, associating its corresponding machining method.

Descriptions of features and of machining methods are stored in a database. Feature description include, but are not limited to, feature types and feature characteristics/attributes. Machining description include, but are not limited to, machining operations sequence (e.g. type, properties, . . . ), the tools (e.g. type, sizes, . . . ).

TABLE 2

Machining Knowledge - Feature AA

| Original Feature's attributes | Methods |
| --- | --- |
| Exampl1, FeatureAA. Diam. = 5 | Method 1 + Tool A |
| Exmp3, FeatureAA. Diam. = 15 | Method 2 + Tool B |
| Exmp12, FeatureAA. Diam. = 10 | Method 1 + Tool A |
| Exmp17, FeatureAA. Diam. = 22 | Method 2 + Tool B |
| Exmp20, FeatureAA. Diam. = 5 | Method 3 + Tool C |

Table 2 illustrates the found associations between features and machining methods for features of type AA having as attribute a diameter. Table 2 schematically represents the information stored in a machining knowledge database for recognized features of a given type having certain attributes and their corresponding associated machining methods. The machining methods typically include the sequence of operations required to machine the feature, the machining parameters (e.g. speed and feed, step over and other parameters), the assigned tool/s and its/their characteristics.

The information of the machining knowledge database represented by Table 2 is analyzed in order to find the application rules of the listed machining methods in terms of attributes of the recognized features. Such analysis may preferably be performed through machine learning techniques. One example of machine learning technique is clustering. The machining methods of Table 2 are clustered so that there is high intra-cluster similarity and low inter-cluster similarity. For example, based on the list of methods per feature type and their characteristics, methods may be grouped into clusters by computing correlations between feature attributes such as e.g. dimensions and the corresponding associated machining methods.

From the machining method clusters, application rules are deduced in terms of feature attributes, e.g. cluster Cx comprises machining methods whose application rule applies to features of type AA having as attribute range a diameter smaller than or equal to 10 mm, cluster Cy is for machining methods whose application rule applies to features of type AA having as attribute range a diameter bigger than 10 mm. All machining methods of one cluster can interchangeably be used for machining each feature of the cluster.

Each machining method in a cluster is assigned with a ranking value for prioritizing the selection of a machining method within the cluster. The criterion for assigning ranking values may for example be based on historical usage where a higher ranking value is assigned to machining methods which were used more.

TABLE 3

Machining Knowledge - Feature AA

| Original Feature attributes | Methods | Cluster | Rank |
| --- | --- | --- | --- |
| Exmp1, FeatureAA. Diam. = 5 mm | Method 1 + Tool A | Clx | 2 |
| Exmp3, FeatureAA. Diam. = 15 mm | Method 2 + Tool B | Cly | 2 |
| Exmp12, FeatureAA. Diam. = 10 mm | Method 1 + Tool A | Clx | 2 |
| Exmp17, FeatureAA. Diam. = 22 mm | Method 2 + Tool B | Cly | 2 |
| Exmp20, FeatureAA. Diam. = 5 mm | Method 3 + Tool C | Clx | 1 |

Table 3 illustrates the two clusters Cx, Cy resulting from the machining method analysis of the feature attributes and their corresponding associated machining methods, where in the last column ranking values according to usage are assigned.

When a CAM engineer loads a new CAD file of a manufacturing part having no corresponding CAM program associated to it, he/she is provided with a proposal for each recognized feature of type AA based on the machining methods of the machining knowledge database and their rankings. A selection of valid machining methods applicable for the input attribute range ordered according to the assigned ranking value is provided to the user.

The user is presented with a selection set m of the highest ranked machining methods of the cluster of feasible machining methods. For example for a feature of type AA and diameter 6 mm, the user is provided with a selection of the two highest ranked methods of cluster Clx which are machining method "Method 1+Tool A" and machining method "Method 3+Tool C", where the first machining method is having the highest ranking value. The user may accept the provided system selection or may be given the option of changing it. Assume, for example, that the user selects a machining method from the cluster having a lower ranking, e.g. machining method "Method 3+Tool C". Such different user choice is captured by the system by updating the assigned ranking value accordingly so that a user selection criterion is taken into account, as for example it is shown in resulting Table 4, where machining method "Method 3+Tool C" gets a ranking value of 4.

TABLE 4

Machining Knowledge - Feature AA

| Original Feature attributes | Methods | Cluster | Rank |
|---|---|---|---|
| Exmp1, FeatureAA. Diam. = 5 mm | Method 1 + Tool A | Clx | 2 |
| Exmp3, FeatureAA. Diam. = 15 mm | Method 2 + Tool B | Cly | 2 |
| Exmp12, FeatureAA. Diam. = 10 mm | Method 1 + Tool A | Clx | 2 |
| Exmp17, FeatureAA. Diam. = 22 mm | Method 2 + Tool B | Cly | 2 |
| Exmp20, FeatureAA. Diam. = 5 mm | Method 3 + Tool C | Clx | 4 |

Advantageously, the suggestion of a machining method, such as e.g. a CAM program, provided to a user may be improved based on user usage frequency, user selection and/or user feedback. In other embodiments, multiple users may contribute with their machining knowledge so that the machining knowledge base may continuously grow and get updated by community and crowd usage.

FIG. 3 illustrates a flowchart 300 of a process for providing a machining method for manufacturing a feature in a part in accordance with disclosed embodiments. Such a process can be performed, for example, by system 100 of FIG. 1 described above, but the "system" in the process below can be any apparatus configured to perform a process as described.

The part is an object to be manufactured having a set of features. Each feature is manufactured by at least one machining method.

At act 305, data of a set of features is received as input. Each feature data describes a feature to be manufactured. The description of the feature comprises a feature type and a set of feature attributes. In other embodiments, the data of the feature is extracted from data of a part by recognizing the feature in the part. In the art, there are several data formats for providing 3D descriptions of parts and their features; an example of it is a CAD format or other 3D formats like e.g. Initial Graphics Exchange Specification (IGES) and STEP formats. Feature and part data may be in form of files or data in a database, in a repository or in the cloud.

At act 310, data of a set of machining methods is received as input. Each machining method data describes a machining method for manufacturing a feature associated to the machining method. In other embodiments, the data of the set of associated machining methods is extracted from data describing a set of machining methods for manufacturing the part with its features. This extraction is done by identifying the machining method to manufacture the recognized feature in the part and by making the corresponding association. In some embodiments, the association of machining methods with feature is done by calculating the manufacturing result of at least one machining method and relating it to the feature of the part, e.g. by calculating the tool path operations or by identifying the feature by calculating the material subtracted out of a part. In the art, there are several machining method data formats and files; an example of it is a CAM program file.

At act 315, an analysis of the machining methods associated to features of a given type is performed so that a set of ranges of feature attributes where the machining methods are applicable is defined. In some embodiments, the analysis is performed via a machine learning technique. Examples of machine learning techniques include, but are not limited to, clustering, neural networks, support vector machine (SVM) and others.

At act 320, machining methods of the given type and applicable in the same range of feature attributes are ranked according to a predefined ranking criterion. Examples of ranking criteria include, but are not limited to, historical usage, user selection, crowd ranking, expert rankings, overall machining time, energy consumption, level of manufacturing accuracy, and others.

At act 325, receiving as input a feature data of an additional feature to be manufactured, wherein the additional feature has not a machining method associated to it yet. The type of the additional feature is the given type and the set of attributes of the additional feature is a specific set of attributes.

At act 330, a set of machining methods for the feature of the given type and applicable in the feature attribute range matching the specific set of attributes is selected.

At act 335, it is provided at least one machining method of the selected methods based on its assigned ranking value to be associated to the additional feature for its manufacturing.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A process for providing a machining method for manufacturing a feature in a part by a data processing system, wherein the part is an object to be manufactured with a set of features, and each feature is manufactured by at least one machining method, the process comprising the following steps:
   a) receiving feature data for a set of features, each feature data describing a feature to be manufactured and including a type of the feature and a set of attributes of the feature;
   b) receiving machining method data of a set of machining methods, each machining method data describing a machining method for manufacturing an associated feature;
   c) analyzing machining methods associated with features of a given type in order to define a set of ranges of feature attributes where the machining methods are applicable;
   d) assigning to each of the machining methods a set of ranking values for ordering the machining methods applicable in a same range of feature attributes;
   e) receiving data of an additional feature to be manufactured, wherein a type of the additional feature is the given type and the set of attributes of the additional feature is a specific set of attributes;
   f) selecting a set of machining methods which are applicable in a range of feature attributes matching the specific set of attributes; and
   g) providing at least one machining method from the selected set of machining methods based on an assigned ranking value to be associated with the additional feature as the machining method for manufacturing the additional feature.

2. The process according to claim 1, wherein:
   step a) comprises extracting the feature data from data of a part by recognizing the feature in the part;
   step b) comprises extracting the set of machining methods data from machining data describing a set of machining methods for manufacturing the part and the set of part features, by identifying the associated machining method to manufacture the recognized feature.

3. The process according to claim 2, wherein the identifying step comprises calculating a manufacturing result of at least one machining method.

4. The process according to claim 1, wherein the ranking values are assigned based on ranking criteria selected from the group consisting of one or more of the following:
   usage;
   user selection;
   crowd ranking;
   expert ranking;
   overall machining time;
   energy consumption; and
   level of accuracy.

5. The process according to claim 1, wherein the part description data is included in a CAD file and/or the machining data is included in a CAM program file.

6. The process according to claim 1, wherein the analyzing step c) comprises a machine learning technique.

7. A process for providing a machining method for manufacturing a feature in a part by a data processing system, wherein the part is an object to be manufactured with a set of features, and each feature is manufactured by at least one machining method, the process comprising the following steps:
   a) receiving feature data of a set of features, each feature data describing a feature to be manufactured and comprising a type of the feature and a set of attributes of the feature;
      wherein the feature data is extracted from data of a part by recognizing the feature in the part;
   b) receiving machining method data of a set of machining methods, each machining method data describing a machining method for manufacturing an associated feature;
      wherein the machining method data of the set of machining methods data is extracted from machining data describing a set of machining methods for manufacturing the part and the set of part features, by identifying the associated machining method to manufacture the recognized feature;
   c) via a machine learning technique, analyzing machining methods associated with features of a given type in order to define a set of ranges of feature attributes where the machining methods are applicable;
   d) assigning to each of the machining methods a set of ranking values for ordering machining methods applicable in a same range of feature attributes;
   e) receiving data of an additional feature to be manufactured, wherein a type of the additional feature is the given type and the set of attributes of the additional feature is a specific set of attributes;
   f) selecting a set of machining methods which are applicable in a range of feature attributes matching the specific set of attributes; and
   g) providing at least one machining method from the selected method set based on an assigned ranking value thereof to be associated with the additional feature as the machining method for manufacturing the additional feature.

8. A data processing system, comprising:
   a processor and an accessible memory, the data processing system being configured for:
   a) receiving feature data for a set of features, each feature data describing a feature to be manufactured and including a type of the feature and a set of attributes of the feature;
   b) receiving machining method data of a set of machining methods, each machining method data describing a machining method for manufacturing an associated feature;
   c) analyzing machining methods associated with features of a given type in order to define a set of ranges of feature attributes where the machining methods are applicable;
   d) assigning to each of the machining methods a set of ranking values for ordering the machining methods applicable in a same range of feature attributes;
   e) receiving data of an additional feature to be manufactured, wherein a type of the additional feature is the given type and the set of attributes of the additional feature is a specific set of attributes;
   f) selecting a set of machining methods which are applicable in a range of feature attributes matching the specific set of attributes; and
   g) providing at least one machining method from the selected set of machining methods based on an assigned ranking value to be associated with the additional feature as the machining method for manufacturing the additional feature.

9. The data processing system according to claim 8, wherein said processor is configured to:
   extract the feature data from data of a part by recognizing the feature in the part; and
   extract the set of machining method data from machining data describing a set of machining methods for manufacturing the part and the set of part features, by identifying the associated machining method to manufacture said recognized feature.

10. The data processing system according to claim 8, wherein the ranking values are assigned based on ranking criteria selected from the group consisting of one or more of the following:
    usage;
    user selection;
    crowd ranking;
    expert ranking;
    overall machining time;
    energy consumption; and
    level of accuracy.

11. The data processing system according to claim 8, wherein the part description data is included in a CAD file and/or the machining data is included in a CAM program file.

12. The data processing system of claim 8, wherein said processor is configured to analyze the machining methods with a machine learning process.

13. A non-transitory computer-readable medium encoded with executable instructions that, when executed, cause one or more data processing systems to perform the following process steps:
    a) receiving feature data for a set of features, each feature data describing a feature to be manufactured and including a type of the feature and a set of attributes of the feature;
    b) receiving machining method data of a set of machining methods, each machining method data describing a machining method for manufacturing an associated feature;
    c) analyzing machining methods associated with features of a given type in order to define a set of ranges of feature attributes where the machining methods are applicable;
    d) assigning to each of the machining methods a set of ranking values for ordering the machining methods applicable in a same range of feature attributes;
    e) receiving data of an additional feature to be manufactured, wherein a type of the additional feature is the given type and the set of attributes of the additional feature is a specific set of attributes;
    f) selecting a set of machining methods which are applicable in a range of feature attributes matching the specific set of attributes; and
    g) providing at least one machining method from the selected set of machining methods based on an assigned ranking value to be associated with the additional feature as the machining method for manufacturing the additional feature.

14. The non-transitory computer-readable medium according to claim 13, wherein:
    the received feature data are extracted from data of a part by recognizing the feature in the part; and
    the received set of machining methods data are extracted from machining data describing a set of machining methods for manufacturing the part and the set of part features, by identifying the associated machining method to manufacture said recognized feature.

15. The non-transitory computer-readable medium of claim 13, wherein said ranking values are assigned based on ranking criteria selected from the group consisting of one or more of the following:
    usage;
    user selection;
    crowd ranking;
    expert ranking;
    overall machining time;
    energy consumption; and
    level of accuracy.

16. The non-transitory computer-readable medium according to claim 13, wherein the part description data is included in a CAD file and/or the machining data is included in a CAM program file.

17. The non-transitory computer-readable medium according to claim 13, wherein the executable instructions are configured to cause the one or more data processing systems to analyze the machining methods via a machine learning process.

* * * * *